United States Patent
Reining (10) Patent No.: US 10,757,520 B2
(45) Date of Patent: Aug. 25, 2020

(54) MEASURING APPARATUS FOR MEASURING THE FORCE FACTOR OF A DYNAMIC LOUDSPEAKER DRIVER

(71) Applicant: Sound Solutions International Co., Ltd., Beijing (CN)

(72) Inventor: Friedrich Reining, Vienna (AT)

(73) Assignee: Sound Solutions International Company, Ltd., Beijing (CN)

( * ) Notice: Subject to any disclaimer, the term of this patent is extended or adjusted under 35 U.S.C. 154(b) by 0 days.

(21) Appl. No.: 16/576,297

(22) Filed: Sep. 19, 2019

(65) Prior Publication Data

US 2020/0100039 A1    Mar. 26, 2020

(30) Foreign Application Priority Data

Sep. 21, 2018  (AT) .............. A 50812/2018

(51) Int. Cl.
*H04R 29/00* (2006.01)
*G01L 5/00* (2006.01)

(52) U.S. Cl.
CPC .......... *H04R 29/001* (2013.01); *G01L 5/0028* (2013.01)

(58) Field of Classification Search
CPC .................. G01L 5/0028; H04R 29/001
(Continued)

(56) References Cited

U.S. PATENT DOCUMENTS 9,826,309 B2 * 11/2017 Savvopoulos ......... H04R 3/007
2015/0124982 A1 * 5/2015 Berthelsen ........... H04R 29/001
381/59

(Continued)

FOREIGN PATENT DOCUMENTS

WO    2014045123 A2    3/2014
WO    2015143127 A1    9/2015
(Continued)

OTHER PUBLICATIONS

Office Action issued for priority application A50812/2018, dated May 21, 2019.

*Primary Examiner* — Vivian C Chin
*Assistant Examiner* — Friedrich Fahnert
(74) *Attorney, Agent, or Firm* — Steven McMahon Zeller; Dykema Gossett PLLC (57) ABSTRACT

A measuring apparatus for measuring the force factor of a dynamic loudspeaker driver comprises first and second terminals for connecting a dynamic loudspeaker driver to the measuring apparatus, an amplifier configured to generate a voltage, a voltage measuring device configured to measure the voltage present at the first terminal, a displacement measuring device configured to measure the displacement of the membrane of the dynamic loudspeaker driver with respect to the magnet, and an electric/electronic device connected between the amplifier and the first terminal. The measuring apparatus is configured to operate in a first mode of operation the amplifier to generate a voltage and to operate the electric/electronic device to have a low impedance during the first mode of operation, such that the voltage is substantially present at the first terminal in order to displace the membrane with respect to the magnet. The measuring apparatus is configured to operate the electric/electronic device to have a high impedance during a second mode of operation, such that the dynamic loudspeaker connected to the measuring apparatus moves its displaced membrane, resulting in an induced voltage generated by the dynamic loudspeaker driver and being present at the first terminal. The measuring apparatus comprises an evaluation device configured to determine the force factor of the dynamic loudspeaker driver connected to the measuring apparatus in response to the measured displacement of the (Continued)

membrane and the induced voltage measured by the voltage measuring device during the second mode of operation.

10 Claims, 4 Drawing Sheets

(58) Field of Classification Search
USPC ....... 381/55, 58, 59, 96, 104, 111, 117, 120, 381/323
See application file for complete search history.

(56) References Cited

U.S. PATENT DOCUMENTS

2015/0304772 A1* 10/2015 Risberg .................. H04R 3/007
381/55
2017/0318390 A1* 11/2017 Bjork .................... G10L 21/038

FOREIGN PATENT DOCUMENTS

| WO | 2016058636 A1 | 4/2016 |
| WO | 2016058637 A1 | 4/2016 |

* cited by examiner

MEASURING APPARATUS FOR MEASURING THE FORCE FACTOR OF A DYNAMIC LOUDSPEAKER DRIVER

PRIORITY

This patent application claims priority to Austria Patent Application No. A50812/2018, filed on Sep. 21, 2018, the disclosure of which is incorporated herein, in its entirety, by reference.

BACKGROUND OF THE INVENTION a. Field of the Invention

The invention relates to a measuring apparatus for measuring the force factor of a dynamic loudspeaker driver.

b. Related Prior Art

A dynamic loudspeaker driver usually comprises a magnet, a membrane movably mounted with respect to the magnet and a voice coil attached to the membrane. The voice coil is operatively coupled with the magnet.

Dynamic loudspeaker drivers can, for instance, be described by a set of electromechanical parameters that describe their performances. One of the electromechanical parameters is the force factor. The force factor is a function of the voice coil or membrane displacement depending on the geometry of the voice coil and the magnetic field generated by the magnet.

SUMMARY OF THE INVENTION

It is an object of the present invention to provide an apparatus for measuring the force factor of a dynamic loudspeaker driver.

The object of the invention is achieved by means of a measuring apparatus for measuring the force factor of a dynamic loudspeaker driver comprising:

first and second terminals for connecting a dynamic loudspeaker driver to the measuring apparatus, the dynamic loudspeaker driver comprising a magnet, a membrane movably mounted with respect to the magnet, and a voice coil attached to the membrane and operatively coupled with the magnet;

an amplifier configured to generate a voltage;

a voltage measuring device configured to measure the voltage present at the first terminal;

a displacement measuring device configured to measure the displacement of the membrane or voice coil with respect to the magnet;

an electric/electronic device connected between the amplifier and the first terminal; the measuring apparatus being configured to operate in a first mode of operation the amplifier to generate a voltage and to operate the electric/electronic device to have a low impedance during the first mode of operation, such that the voltage generated by the amplifier is substantially present at the first terminal in order to displace the membrane with respect to the magnet, and the measuring apparatus being configured to operate the electric/electronic device to have a high impedance during a second mode of operation, such that the dynamic loudspeaker driver connected to the measuring apparatus moves its displaced membrane, resulting in an induced voltage generated by the dynamic loudspeaker driver and being present at the first terminal, the second mode of operation immediately following the first mode of operation; and an evaluation device configured to determine the force factor of the dynamic loudspeaker driver connected to the measuring apparatus in response to the measured displacement of the membrane and the induced voltage measured by the voltage measuring device during the second mode of operation.

The measuring apparatus may comprise a control device configured to control the measuring apparatus. Particularly, the control device controls the amplifier during the different modes of operation.

The measuring apparatus comprises the amplifier which generates during the first mode of operation the voltage. The voltage is preferably a dc voltage. The measuring apparatus further comprises the first and second terminals at which the dynamic loudspeaker driver is connected for measuring its force factor. The second terminal may, for instance, be connected to ground.

The electric/electronic device of the measuring apparatus is connected between the amplifier and the first terminal. The electric/electronic device has a low impedance, in particular a low resistance, preferably zero resistance during the first mode of operation. Consequently, the voltage generated by the amplifier during the first mode of operation is present at the first terminal, causing the membrane and the voice coil to be displaced with respect to the magnet. During the first mode of operation, the membrane and the voice coil are displaced depending on the value of the voltage. The voltage present at the first terminal may be measured with respect to a reference potential, in particular with respect to ground.

During the second mode of operation, the electric/electronic device has a high impedance, preferably a high resistance and even more preferably an "indefinite" resistance. Depending on the kind of electric/electronic device, the measuring apparatus may be configured to operate the amplifier to be turned off or to generate no voltage during the second mode of operation. This may be controlled by the control device, if applicable.

Therefore, during the second mode of operation, the voltage of the amplifier is not present anymore at the first terminal and the membrane can move back from its displacement or excursion. Due to this movement, a voltage is induced into the voice coil. This induced voltage can be measured by the voltage measuring device.

The measuring apparatus comprises the evaluation device configured to determine the force factor of the dynamic loudspeaker driver connected to the measuring apparatus in response to the measured displacement (excursion) of the membrane or voice coil during the second mode of operation and the induced voltage measured by the measuring device during the second mode of operation.

The force factor BL (z) is an electromechanical parameter of the dynamic loudspeaker driver and is a function of the voice coil or membrane displacement or excursion z depending on the geometry of the voice coil and the magnetic field generated by the magnet. The force factor also satisfies the following equation:

$$BL(z,t) * v(z,t) = U_{emf}(t)$$

wherein $U_{emf}$ is the induced voltage and $v(z)$ is the velocity of the moving membrane or voice coil during the second mode of operation. During the second mode of operation, the membrane, and thus the voice coil moves, causing the displacement or excursion of the membrane to change with respect to time t.

The displacement or excursion of the membrane changes during the second mode of operation with time. The evaluation device may be configured to determine the velocity of the membrane or voice coil during the second mode of operation in response to the measured displacement with respect to time. The evaluation device may be configured to determine the force factor of the dynamic loudspeaker driver connected to the measuring apparatus in response to the velocity of the membrane or voice coil during the second mode of operation and in response to the induced voltage with respect to time voltage measured by the measuring device during the second mode of operation.

Displacement or excursion measuring devices as such are known to the skilled person and may, for instance, comprise a laser.

The electric/electronic device may be comprised of a first diode arrangement or be the first diode arrangement. The first diode arrangement has a first anode, a first cathode and a first threshold voltage. Then, the measuring apparatus may be configured to operate the amplifier to generate the voltage during the first mode of operation such that the voltage has a polarity allowing the first diode arrangement to conduct electrically and to operate the amplifier to be turned off or generate no voltage during the second mode of operation following the first mode of operation.

The polarity of the voltage is chosen, so that the first diode arrangement conducts during the first mode of operation. For instance, if the first anode of the first diode arrangement is connected to the amplifier and the first cathode of the first diode arrangement is connected to the first terminal, then the voltage is a positive voltage in order to allow a current flowing through the first diode arrangement, resulting in a low resistance, i.e. a conductive state of the first diode arrangement.

When the voltage of the amplifier is reduced to zero, current stops flowing through the first diode arrangement and prevents also a current flow through the first diode arrangement due to the induced voltage during the second mode of operation.

The first diode arrangement has a threshold voltage which may also be referred to as a built-in potential or knee voltage as it is known to the skilled person in the art. Silicone diodes usually have a threshold or knee voltage of approximately 0.7 V.

The first diode arrangement may be a single first diode, in particular a single first semiconductor or p-n junction diode. The first diode arrangement may be a plurality of first diodes connected in series, in particular a plurality of first semiconductor or p-n junction diodes connected in series. The threshold voltage of a diode arrangement comprised of a plurality of semiconductor diodes connected in series is greater than the threshold voltage of a single semiconductor diode.

The first diode arrangement is preferably chosen such that the first threshold voltage is greater than the absolute value of the induced voltage generated by the dynamic loudspeaker driver connected to the measuring apparatus during the second mode of operation, ensuring that the first diode arrangement has a high impedance, particularly a high resistance during the second mode of operation.

The measuring apparatus may comprise a second diode arrangement having a second anode, a second cathode and a second threshold voltage. One of the first and second diode arrangements is connected with its anode to the first terminal and the other diode arrangement is connected with its cathode to the first terminal. Then, the measuring apparatus may be configured:

to operate during the third mode of operation the amplifier to generate a voltage of opposite polarity compared to the polarity of the voltage during the first mode of operation, in order to displace the membrane of the dynamic loudspeaker driver connected to the measuring apparatus with respect to its magnet; and to operate the amplifier to be turned off or generate no voltage during the fourth mode of operation, such that the dynamic loudspeaker driver connected to the measuring apparatus can move its displaced membrane, resulting in a further induced voltage generated by the dynamic loudspeaker driver and being present at the first terminal, the fourth mode of operation immediately following the third mode of operation.

Then, the evaluation device may be configured to determine the force factor of the dynamic loudspeaker driver connected to the measuring apparatus in response to the measured displacement of the membrane and the further induced voltage measured by the measuring device during the fourth mode of operation.

The second diode arrangement may be a single second diode, in particular a single second semiconductor or p-n junction diode. The second diode arrangement may be a plurality of second diodes connected in series, in particular a plurality of second semiconductor or p-n junction diodes connected in series.

The second diode arrangement is preferably chosen such that the second threshold voltage is greater than the absolute value of the induced voltage generated by the dynamic loudspeaker driver connected to the measuring apparatus during the fourth mode of operation, ensuring that the second diode arrangement has a high impedance, particularly a high resistance during the fourth mode of operation.

If, for instance, the first diode arrangement is connected to the first terminal with its cathode, then the voltage during the first mode of operation is a positive voltage. Then, the second diode arrangement is connected to the terminal with its anode and the voltage during the third mode of operation is a negative voltage.

The measuring apparatus may comprise a switch, preferably a semiconductor switch, for instance a FET. The switch has a first switching state at which the first diode arrangement is connected to the amplifier and the second diode arrangement is not connected to the amplifier, and a second switching state at which the second diode arrangement is connected to the amplifier and the first diode arrangement is not connected to the amplifier. Then, the measuring apparatus may be configured to operate the switch in its first switching state during the first and second modes of operation, and to operate the switch in its second switching state during a third and a fourth mode of operation.

The electric/electronic device may be a further switch. Then, the measuring apparatus may be configured, for instance, controlled by the control device to operate the further switch to be closed during the first mode of operation and to be opened during the second mode of operation. Thus, the amplifier is basically connected directly to the first terminal during the first mode of operation and disconnected during the second mode of operation. The further switch is preferably a semiconductor switch, for instance, a transistor, particularly a FET.

Dynamic loudspeaker drivers may comprise a single voice coil or two or more than two voice coils connected in series. A dynamic loudspeaker driver having at least two voice coils is associated with more than one force factor. One of the force factors is associated with both or all voice coils connected in series. In addition, each voice coil may associated with its individual force factor.

The voice coils may be realized as a stacked voice coil setup, wherein, for instance, two identical half weight voice coils are attached or glued together to form a single voice coil geometrically and electrically. The two voice coils are connected, for instance, at a midpoint.

The measuring apparatus may comprise a third terminal or several third terminals for connecting a dynamic loudspeaker driver to the measuring apparatus, wherein the dynamic loudspeaker driver comprises two or more than two voice coils, i.e. a first and a second voice coil attached to the membrane, operatively coupled with the magnet, and being connected in series. Then, the dynamic loudspeaker driver is connected to the first, second and third terminals of the measuring apparatus.

Then, the voltage measuring device may be configured to measure at least one of the voltages present at the first or third terminal.

During the second mode of operation, the dynamic loudspeaker having at least two voice coils connected in series and connected to the measuring apparatus moves its displaced membrane, resulting in a first induced voltage associated with the first voice coil and a second induced voltage associated with the second voice coil, and generated by the dynamic loudspeaker driver. The first induced voltage is present at the first terminal and the second induced voltage is present at the third terminal.

Then, the evaluation device may be configured to determine at least one of a force factor, first force factor, or second force factor of the dynamic loudspeaker driver connected to the measuring apparatus in response to the measured displacement of the membrane and at least one of the first and second induced voltages measured by the voltage measuring device during the second mode of operation. The force factor is associated with the first and second voice coils connected in series, the first force factor is associated with the first voice coil, and the second force factor is associated with the second voice coil. The force factor BL (z) of both voice coils connected in series can be determined according to the above-mentioned equation:

$$BL(z,t)*v(z,t)=U_{emf}(t)$$

wherein $U_{emf}$ is the induced voltage.

The force factor $BL_n(z)$ of the $n^{th}$ voice coil, i.e. the first (n=1) or second (n=2) can be determined according to the following equation:

$$BL_n(z,t)*v(z,t)=U_{emf,n}(t)$$

wherein $U_{emf}$ n is the induced voltage at the respective terminal and associated with the $n^{th}$ voice coil.

DESCRIPTION OF THE PREFERRED EMBODIMENT

Figure 1:
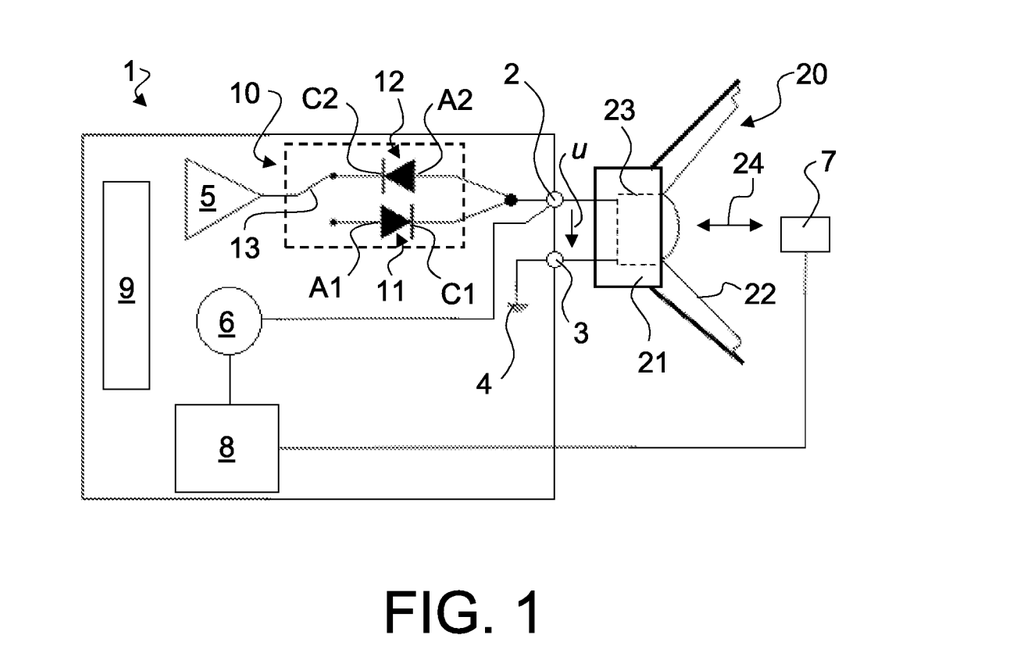
FIG. 1 is a measuring apparatus for measuring the force factor of a dynamic loudspeaker driver.

FIG. 1 shows a measuring apparatus 1 for measuring the force factor BL(z) of a dynamic loudspeaker driver 20.

The dynamic loudspeaker driver 20 comprises a magnet 21, a membrane 22 movably mounted with respect to the magnet 21, and a voice coil 23 attached to the membrane 22 and operatively coupled with the magnet 21. In operation, the voice coil 23 moves with the membrane with respect to an arrow 24.

The measuring apparatus 1 comprises a first terminal 2 and a second terminal 3 which may be connected to ground 4. When measuring the force factor BL(z) of the dynamic loudspeaker driver 20, the dynamic loudspeaker driver 20 is connect to the first and second terminals 2, 3.

The measuring apparatus 1 comprises an amplifier 5 configured to generate a voltage which is in particular a dc voltage $U_{dc}$, and a voltage measuring device 6 configured to measure the voltage u present at the first terminal 2. In particular, the voltage measuring device 5 is configured to measure the voltage u across the first and second terminals 2, 3, i.e. the voltage u at the first terminal 2 with respect to ground 4.

The measuring apparatus 1 comprises a displacement measuring device 7 configured to measure the displacement or excursion z of the membrane 22 with respect to the magnet 21. The displacement measuring device 7 comprises, for instance, a laser.

The measuring apparatus 1 comprises an evaluation device 8 configured to determine the force factor BL(z) of the dynamic loudspeaker driver 20 connected to the measuring apparatus 1.

The measuring apparatus 1 may comprise a control device 9 configured to control the operation of the measuring apparatus 1, in particular to control the amplifier 5.

The measuring apparatus 1 comprises an electric/electronic device 10 connected between the amplifier 5 and the first terminal 2.

Figure 3:
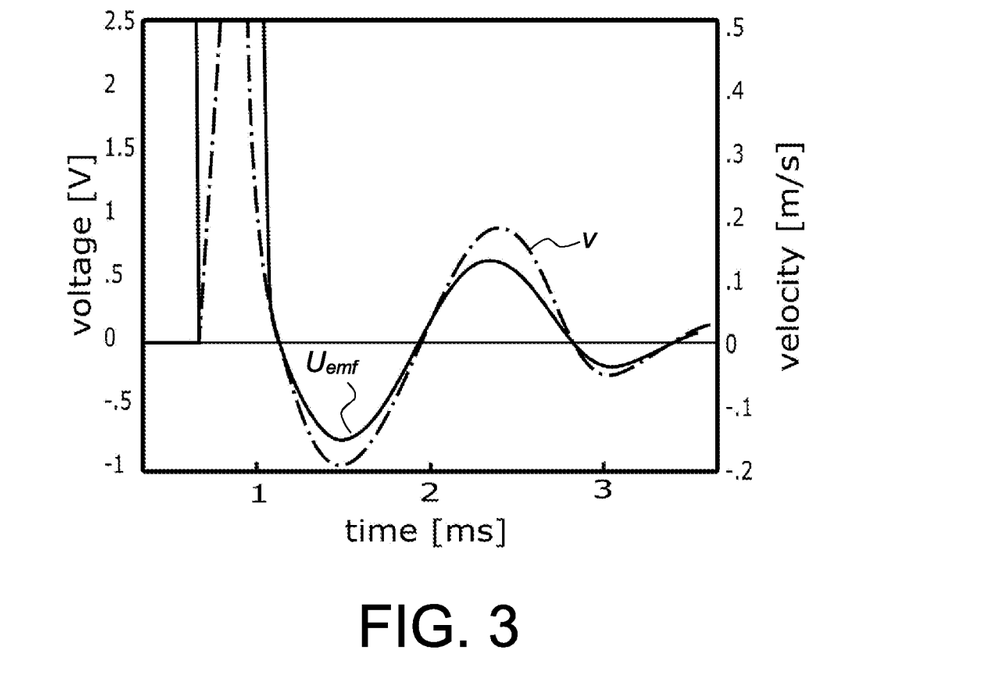
Figure 4:
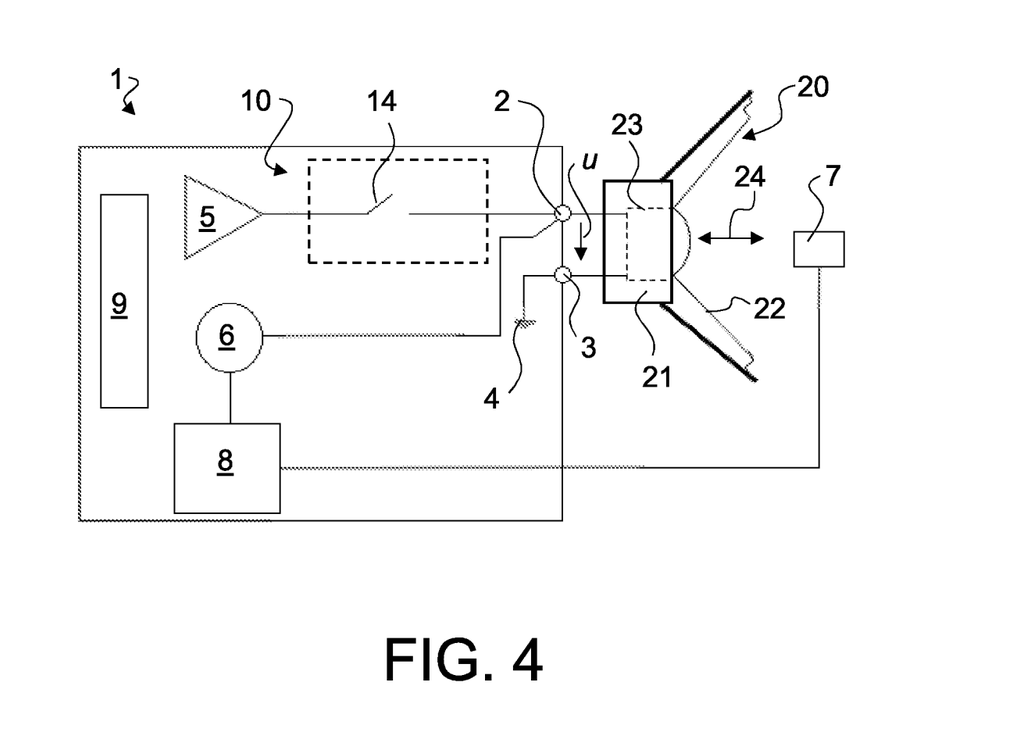
FIG. 4 is an alternative embodiment of the measuring apparatus.

FIG. 3 an FIG. 4 are diagrams illustrating the measurement of the force factor BL(z).

Figure 2:
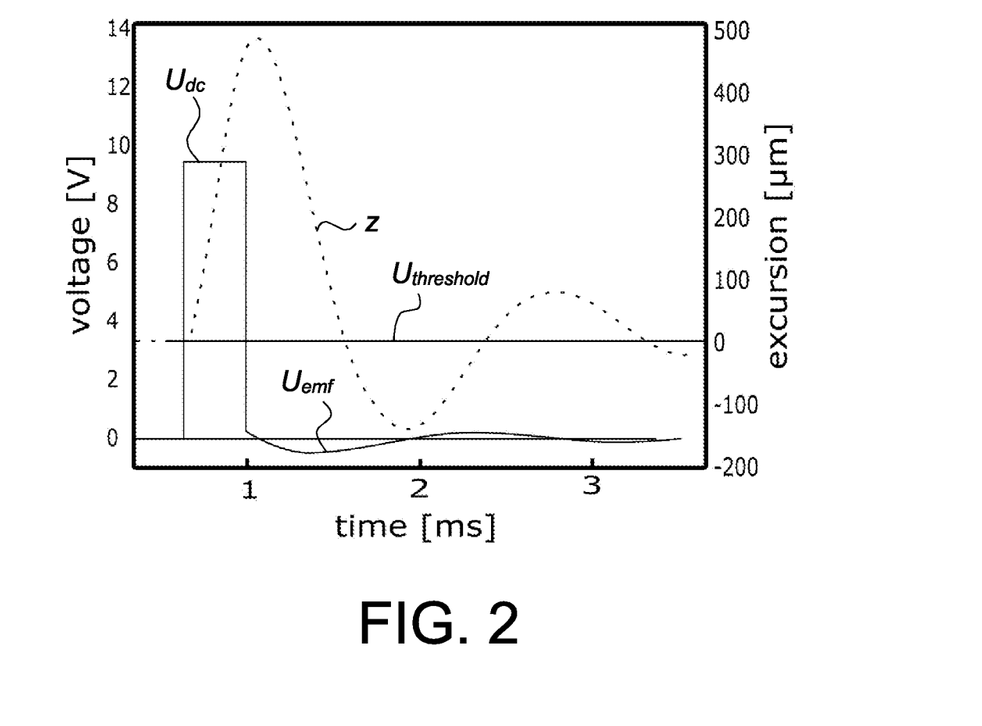
FIGS. 2 and 3 are diagrams illustrating the measurement of a dynamic loudspeaker driver utilizing the measuring apparatus.

The measuring apparatus 1 is configured to operate in a first mode of operation during which the amplifier 5, controlled by the control device 9, generates a dc voltage $U_{dc}$. During the first mode of operation, the electric/electronic device 10 has a low impedance, preferably a low resistance or even no resistance at all, i.e. conducts. Therefore, the dc voltage $U_{dc}$ generated by the amplifier 5 is substantially present at the first terminal 2 and displaces the membrane 22 with respect to the magnet 21. During the first mode of operation, the voltage u across the first and second terminals 2, 3, i.e. the voltage u at the first terminal 2 with respect to ground 4 substantially equals the dc voltage $U_{dc}$. For the example shown in FIG. 2 and FIG. 3, the first mode of operation lasts from t=0.5 ms to t=1 ms. The resulting displacement or excursion z of the membrane 22 is shown in FIG. 2.

The measuring apparatus 1 is configured to operate in a second mode of operation which follows immediately after the first mode of operation. In the example shown in FIG. 2 and FIG. 3, the second mode of operation starts at t=1 ms.

During the second mode of operation the electric/electronic device 10 has a high impedance, such that the dynamic loudspeaker driver 20 connected to the measuring apparatus 1 moves its displaced membrane 22, resulting in an induced voltage $U_{emf}$ generated by the dynamic loudspeaker driver 20. The induced voltage $U_{emf}$ is present at the first terminal 2. During the second mode of operation, the voltage u across the first and second terminals 2, 3, i.e. the voltage u at the first terminal 2 with respect to ground 4 substantially equals the induced voltage $U_{emf}$ which is measured by the voltage measuring device 6.

The evaluation device 8 is configured to determine the force factor BL(z) of the dynamic loudspeaker driver 20 connected to the measuring apparatus 1 in response to the measured displacement or excursion z of the membrane 22 and the induced voltage $U_{emf}$ measured by the voltage measuring device 6 during the second mode of operation.

The force factor BL(z) also satisfies the following equation:

$$BL(z,t)*v(z,t)=U_{emf}(t)$$

wherein v is the velocity of the moving membrane 22 during the second mode of operation. During the second mode of operation, the membrane 22, and thus the voice coil 23 moves, causing the displacement or excursion z of the membrane 22 to change with respect to time t. The velocity v can be derived by the changing displacement or excursion z.

For the present embodiment, the evaluation device 8 is configured to determine the velocity v of the moving membrane 22 from the measured displacement or excursion z. The evaluation device 8 is configured to determine the force factor BL(z) in response to the measured velocity v of the moving membrane 22 and in response to the measured induced voltage $U_{emf}$.

For values around zero of the determined velocity v, no displacement factor can be determined.

As shown in FIG. 1, the electric/electronic device 10 may be comprised of a first diode arrangement 11 or be the first diode arrangement 11. The first diode arrangement 11 has a first anode A1, a first cathode C1 and a first threshold voltage $U_{threshold}$. Then, the measuring apparatus 1 may be configured to operate the amplifier 5 to generate the dc voltage $U_{dc}$ during the first mode of operation such that the dc voltage $U_{dc}$ has a polarity allowing the first diode arrangement 11 to conduct electrically and to operate the amplifier 5 to be turned off or generate no voltage during the second mode of operation. Is, for instance, the dc voltage $U_{dc}$ positive, then the first cathode C1 is connected to the first terminal 2, as shown in FIG. 1.

When the voltage of the amplifier 5 is reduced at t=ms to zero, then the second mode of operation starts and current stops flowing through the first diode arrangement 11 and prevents also a current flow through the first diode arrangement due to the induced voltage $U_{emf}$ during the second mode of operation.

The first diode arrangement 11 may be a single first diode, in particular a single first semiconductor or p-n junction diode. The first diode arrangement 11 may be a plurality of first diodes connected in series, in particular a plurality of first semiconductor or p-n junction diodes connected in series.

The first diode arrangement 11 is preferably chosen such that the first threshold voltage $U_{threshold}$ is greater than the absolute value of the induced voltage $U_{emf}$ generated by the dynamic loudspeaker driver 20 connected to the measuring apparatus 1 during the second mode of operation.

The measuring apparatus 1 may comprise a switch 13, preferably a semiconductor switch, for instance a FET, and a second diode arrangement 12 having a second anode A2, a second cathode C2 and a second threshold voltage. The switch 13 has a first switching state at which the first diode arrangement 11 is connected to the amplifier 5 and the second diode arrangement 12 is not connected to the amplifier 5, and a second switching state at which the second diode arrangement 12 is connected to the amplifier 5 and the first diode arrangement 11 is not connected to the amplifier 5 device. One of the first and second diode arrangements 11, 12 is connected with its anode to the first terminal 2 and the other diode arrangement is connected with its cathode to the terminal. For the embodiment shown in FIG. 1, the second anode A2 of the second diode arrangement 12 is connected to the first terminal 2.

For this embodiment, the measuring apparatus 1 is configured, controlled by the control device 9 to operate the switch 13 in its first switching state during the first and second modes of operation, and to operate the switch 13 in its second switching state during a third and a fourth mode of operation.

During the third mode of operation the amplifier 5 generate a dc voltage of opposite polarity compared to the polarity of the dc voltage during the first mode of operation, in order to displace the membrane 22 of the dynamic loudspeaker driver 20 connected to the measuring apparatus 1 with respect to its magnet 21.

The fourth mode of operation follows the third mode of operation. During the fourth mode of operation, the amplifier 5 is turned off or generates no voltage. Then, the dynamic loudspeaker driver 20 connected to the measuring apparatus 1 can move its displaced membrane 22, resulting in a further induced voltage generated by the dynamic loudspeaker driver 20 and being present at the first terminal 2.

Then, the evaluation device 8 is configured to determine the force factor of the dynamic loudspeaker driver 20 connected to the measuring apparatus 1 in response to the measured displacement of the membrane 22 and the further induced voltage measured by the voltage measuring device 6 during the fourth mode of operation.

The second diode arrangement 12 may be a single second diode, in particular a single second semiconductor or p-n junction diode. The second diode arrangement 12 may be a plurality of second diodes connected in series, in particular a plurality of second semiconductor or p-n junction diodes connected in series.

If the absolute value of the voltage induced by the transducers velocity is lower than the threshold voltage of the diode arrangement 11 and 12, then the switch 13 can be omitted. This means, that both diode arrangements are connected to the amplifier as well as to the terminal. In this case, the diode arrangement, which is due to the signal polarity of the amplifier 5 in a non-conductive state, adds only a very high impedance to the speaker-amplifier connection dominated by the conductive diode arrangement.

If, for example, the amplifier 5 is configured to supply a positive DC voltage, then the diode arrangement 11 will be in a conductive state, while the diode arrangement 12 will be in a non-conductive state, for both modes of operation.

The impact of such a high impedance connected in parallel to the low impedance connection can be rated as low and, therefore, negligible, if measurement time and complexity of the setup can be reduced.

In an alternative embodiment shown in FIG. 4, the electric/electronic device 10 is a further switch 14. The measuring apparatus 1 is configured, controlled by the control device 9, to operate the further switch 14 to be closed during the first mode of operation and to be opened during the second mode of operation. The further switch 13 is preferably a semiconductor switch, for instance, a transistor, particularly a FET.

Figure 5:
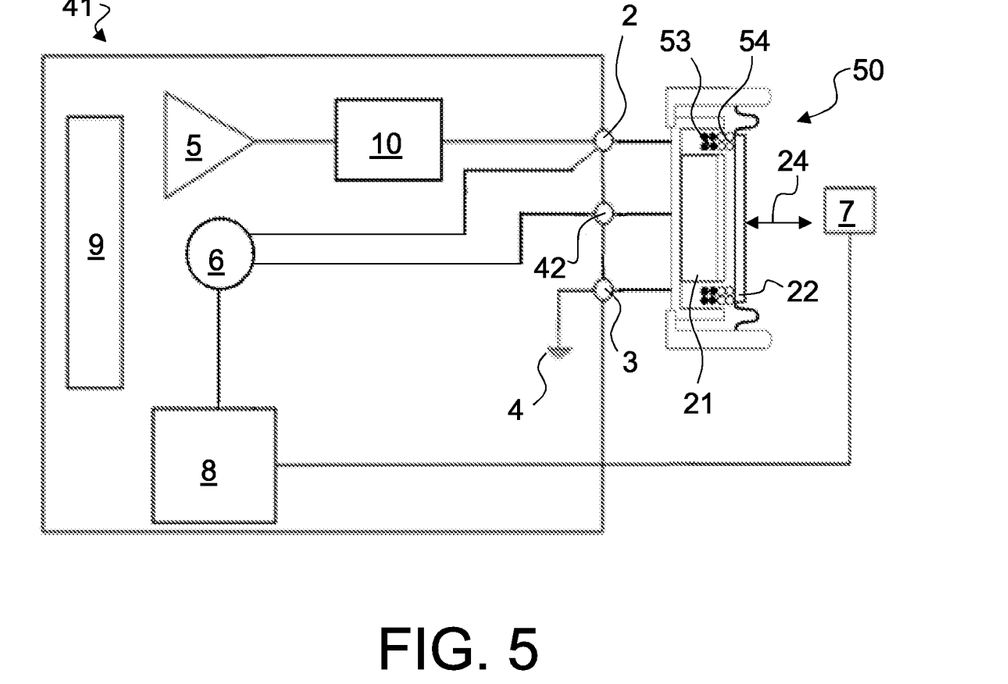
FIG. 5 is another measuring apparatus.
Figure 6:
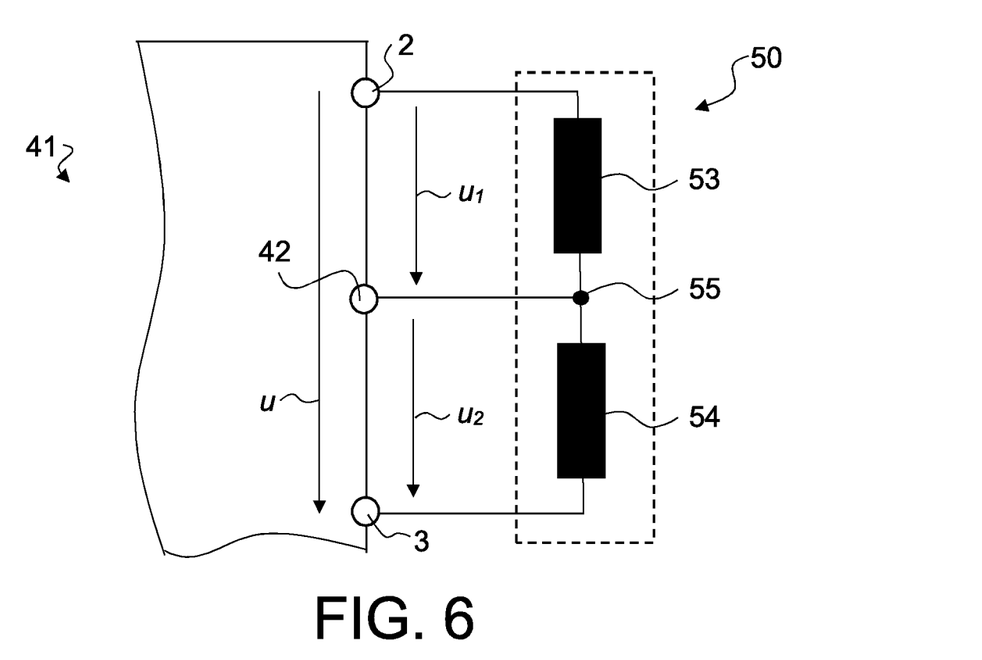
FIG. 6 is an electrical circuit representing the measurement of a dynamic loudspeaker driver having two voice coils.

FIG. 5 shows a further measuring apparatus 41 for measuring the force factor of a dynamic loudspeaker driver 51. The measuring apparatus 41 of FIG. 5 differs from those of FIGS. 1, 4 by having, in addition to the first and second terminals 2, 3 a third terminal 42. The measuring apparatus 41 of FIG. 5 is, inter alia, intended to measure one or more force factors of a dynamic loudspeaker driver 50 having a first voice coil 53 and a second voice coil 54 connected in series. FIG. 6 shows an electric circuit diagram of the dynamic loudspeaker driver 50.

The two voice coils 53, 54 are connected in series at a mid-point connection 55.

The dynamic loudspeaker driver 50 has more than one force factor. Particularly, the dynamic loudspeaker driver 50 may have a force factor associated with both, the first and second voice coils 53, 54 connected in series, a first force factor associated with the first voice coil 53, and a second force factor associated with the second voice coil 54.

For the embodiment shown in FIGS. 5, 6, the first voice coil 53 is connected to the first and third terminals 2, 42, and the second voice coil 54 is connected to the third and second terminals 42, 3. The midpoint connection 55 is connected to the third terminal 42.

During the first mode of operation, the amplifier 5, controlled by the control device 9, generates the dc voltage $U_{dc}$. Then, the voltage u across the first and second terminal 2, 3 equals the dc voltage $U_{dc}$.

During the second mode of operation the electric/electronic device 10 has a high impedance, such that the dynamic loudspeaker driver 50 connected to the measuring apparatus 41 moves its displaced membrane 22, resulting in a first induced voltage $U_{emf,1}$ generated by the first voice coil 53, and a second induced voltage $U_{emf,2}$ generated by the second voice coil 54. Therefore, the voltage $u_1$ across the first voice coil 53 equals the first induced voltage $U_{emf,1}$, and the voltage $u_2$ across the second voice coil 54 equals the second induced voltage $U_{emf,2}$. The induced voltages are measured by the voltage measuring device 6 of the measuring apparatus 41 in particular simultaneously. The voltage measuring device 6 is configured, for instance, to measure the voltages u across the first and second terminals 2, 3 and the voltage across the third and second terminals 42, 3. Then, the voltage measuring device 6 or the evaluation device 8 are configured to determine the first and second induced voltages $U_{emf,1}$, $U_{emf,2}$. Utilizing the measured voltages.

The force factor BL (z) of both voice coils 53, 54 connected in series can be determined according to the above-mentioned equation:

$$BL(z,t)*v(z,t)=U_{emf}(t)$$

wherein $U_{emf}$ is the induced voltage, i.e. the voltage u measured during the second mode of operation.

The force factor $BL_1$ (z) of the first voice coil 53 can be determined according to the following equation:

$$BL_1(z,t)*v(z,t)=U_{emf,1}(t)$$

The force factor $BL_2$ (z) of the second voice coil 54 can be determined according to the following equation:

$$BL2(z,t)*v(z,t)=U_{emf,2}(t)$$

Figure 7:
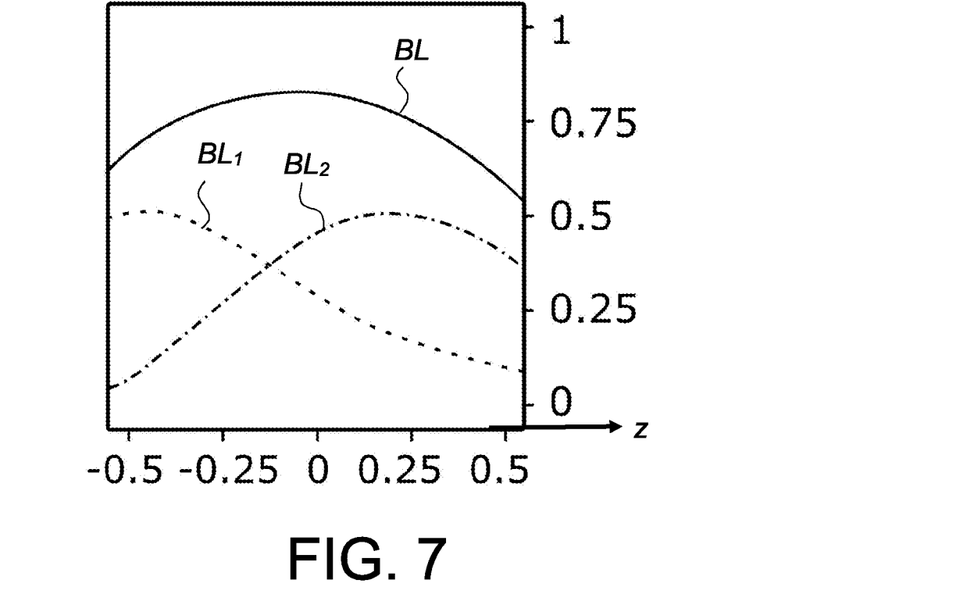
FIG. 7 is a diagram illustrating force factors of the dynamic loudspeaker driver having two voice coils.

FIG. 7 shows a diagram showing the course of the force factors with respect to the displacement z.

Figure 8:
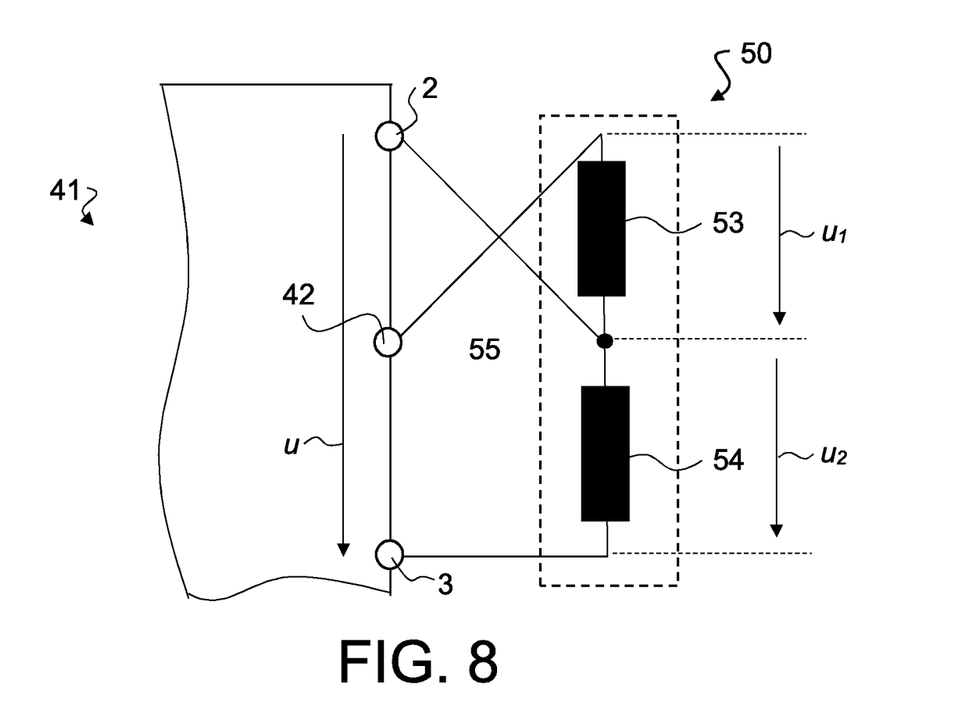
FIG. 8 is an electrical circuit representing an example of the excitation of the dynamic loudspeaker driver having two voice coils.

FIG. 8 shows an alternative connection of the dynamic loudspeaker driver 50 to the measuring apparatus 41 for measuring the force factors of the dynamic loudspeaker driver 50. In the example shown in FIG. 8, the second voice coil 54 is connected to the first and second terminals 2, 3. Therefore, the membrane 22 is moved, i.e. displaced only be the second voice coil 54 during the first mode of operation. The first voice coil 53 is connected to the first and third terminals 2, 42.

During the second mode of operation, the voltages $u_1$, $u_2$ corresponding to the first and second induced voltages $U_{emf,1}$, $U_{emf,2}$ can be determined, and thus the corresponding force factors.

Although modifications and changes may be suggested by those skilled in the art, it is the intention of the invention to embody within the patent warranted hereon all changes and modifications as reasonably and properly come within the scope of his contribution to the art.

What is claimed is:

1. A measuring apparatus for measuring the force factor of a dynamic loudspeaker driver comprising:
   first and second terminals for connecting a dynamic loudspeaker driver to the measuring apparatus, the dynamic loudspeaker driver comprising a magnet, a membrane movably mounted with respect to the magnet, and a voice coil attached to the membrane and operatively coupled with the magnet;
   an amplifier configured to generate a voltage;
   a voltage measuring device configured to measure the voltage present at the first terminal;
   a displacement measuring device configured to measure the displacement of the membrane or voice coil with respect to the magnet;
   an electric/electronic device connected between the amplifier and the first terminal; the measuring apparatus being configured to operate in a first mode of operation the amplifier to generate a voltage and to operate the electric/electronic device to have a low impedance during the first mode of operation, such that the voltage generated by the amplifier is substantially present at the first terminal in order to displace the membrane with respect to the magnet, and the measuring apparatus being configured to operate the electric/electronic device to have a high impedance during a second mode of operation, such that the dynamic loudspeaker connected to the measuring apparatus moves its displaced membrane, resulting in an induced voltage generated by the dynamic loudspeaker driver and being present at the first terminal, the second mode of operation immediately following the first mode of operation; and
   an evaluation device configured to determine the force factor of the dynamic loudspeaker driver connected to the measuring apparatus in response to the measured displacement of the membrane and the induced voltage measured by the voltage measuring device during the second mode of operation.

2. The measuring apparatus of claim 1, wherein the electric/electronic device is comprised of a first diode arrangement having a first anode, a first cathode and a first threshold voltage, the measuring apparatus being configured to operate the amplifier to generate the voltage during the first mode of operation such that the voltage has a polarity allowing the first diode arrangement to conduct electrically and to operate the amplifier to be turned off or generate no voltage during the second mode of operation.

3. The measuring apparatus of claim 2, wherein the first threshold voltage of the first diode arrangement is greater than the absolute value of the induced voltage generated by the dynamic loudspeaker driver connected to the measuring apparatus during the second mode of operation.

4. The measuring apparatus of claim 2, comprising a second diode arrangement having a second anode, a second cathode and a second threshold voltage, one of the first and second diode arrangements being connected with its anode to the first terminal and the other diode arrangement being connected with its cathode to the first terminal, the measuring apparatus being configured:
   to operate during the third mode of operation the amplifier to generate a voltage of opposite polarity compared to the polarity of the voltage during the first mode of operation, in order to displace the membrane of the dynamic loudspeaker driver connected to the measuring apparatus with respect to its magnet; and
   to operate the amplifier to be turned off or generate no voltage during the fourth mode of operation, such that the dynamic loudspeaker driver connected to the measuring apparatus can move its displaced membrane, resulting in a further induced voltage generated by the dynamic loudspeaker driver and being present at the terminal, the evaluation device configured to determine the force factor of the dynamic loudspeaker driver connected to the measuring apparatus in response to the measured displacement of the membrane and the further induced voltage measured by the measuring device during the fourth mode of operation, the fourth mode of operation immediately following the third mode of operation.

5. The measuring apparatus of claim 4, wherein the second threshold voltage of the second diode arrangement is greater than the absolute value of the further induced voltage generated by the dynamic loudspeaker driver connected to the measuring apparatus during the fourth mode of operation.

6. The measuring apparatus of claim 4, comprising a switch having a first switching state at which the first diode arrangement is connected to the amplifier and the second diode arrangement is not connected to the amplifier, and a second switching state at which the second diode arrangement is connected to the amplifier and the first diode arrangement is not connected to the amplifier, one of the first and second diode arrangements being connected with its anode to the first terminal and the other diode arrangement being connected with its cathode to the first terminal, the measuring apparatus being configured:
   to operate the switch in its first switching state during the first and second modes of operation; and
   to operate the switch in its second switching state during a third and a fourth mode of operation.

7. The measuring apparatus of claim 2, wherein the electric/electronic device is a further switch, the measuring apparatus being configured to operate the further switch to be closed during the first mode of operation and to be opened during the second mode of operation.

8. The measuring apparatus of claim 1, comprising a third terminal for connecting a dynamic loudspeaker driver to the measuring apparatus, the dynamic loudspeaker driver comprising a magnet, a membrane movably mounted with respect to the magnet, and first and a second voice coils attached to the membrane, operatively coupled with the magnet, and being connected in series;
   the voltage measuring device being configured to measure at least one of the voltages present at the first or third terminal; and
   the dynamic loudspeaker connected to the measuring apparatus moving its displaced membrane during the second mode of operation, resulting in a first induced voltage associated with the first voice coil and a second induced voltage associated with the second voice coil, and generated by the dynamic loudspeaker driver, the first induced voltage being present at the first terminal and the second induced voltage being present at the third terminal; and
   the evaluation device being configured to determine at least one of a force factor, first force factor, or second force factor of the dynamic loudspeaker driver connected to the measuring apparatus in response to the measured displacement of the membrane and at least one of the first and second induced voltages measured by the voltage measuring device during the second mode of operation, the force factor being associated with the first and second voice coils, the first force factor being associated with the first voice coil, and the second force factor being associated with the second voice coil.

9. The measuring apparatus of claim 1, comprising a control device configured to control the operation of the measuring apparatus.

10. The measuring apparatus of claim 1, wherein the displacement of the membrane changes during the second mode of operation with time, the evaluating device being configured to determine the velocity of the membrane during the second mode of operation in response to the measured displacement with respect to time, and the evaluating device being configured to determine the force factor of the dynamic loudspeaker driver connected to the measuring apparatus in response to the velocity of the membrane during the second mode of operation and in response to the induced voltage with respect to time measured by the voltage measuring device during the second mode of operation.

* * * * *